United States Patent
Xing et al.

(10) Patent No.: US 11,827,780 B2
(45) Date of Patent: Nov. 28, 2023

(54) MODIFIED POLYGLYCOLIC ACID AND MOLDED ARTICLES FOR DEGRADABLE DOWNHOLE TOOLS APPLICATION

(71) Applicants: CNPC USA Corporation, Houson, TX (US); BEIJING HUAMEI, INC., Beijing (CN); CHINA NATIONAL PETROLEUM CORPORATION, Beijing (CN)

(72) Inventors: Peixiang Xing, Houston, TX (US); Jiaxiang Ren, Houston, TX (US); Peng Cheng, Houston, TX (US); Yu Liu, Beijing (CN)

(73) Assignees: CNPC USA CORPORATION, Houston, TX (US); BEIJING HUAMEI INC., Beijing (CN); CHINA NATIONAL PETROLEUM CORPORATION, Beijing (CN)

( * ) Notice: Subject to any disclaimer, the term of this patent is extended or adjusted under 35 U.S.C. 154(b) by 94 days.

(21) Appl. No.: 17/643,366

(22) Filed: Dec. 8, 2021

(65) Prior Publication Data

US 2023/0174777 A1    Jun. 8, 2023

(51) Int. Cl.
*C08L 67/04*     (2006.01)
(52) U.S. Cl.
CPC ......... *C08L 67/04* (2013.01); *C08L 2205/025* (2013.01); *C08L 2205/03* (2013.01)

(58) Field of Classification Search
CPC ......... C08G 63/08; C08G 63/06; C08L 67/04; C08L 2205/025; C08L 2205/03
See application file for complete search history.

(56) References Cited

U.S. PATENT DOCUMENTS

| | | | |
|---|---|---|---|
| 5,502,158 A | 3/1996 | Sinclair et al. | |
| 2010/0041831 A1 | 2/2010 | Chung et al. | |
| 2011/0190456 A1* | 8/2011 | Itoh | C08L 67/04 525/450 |
| 2015/0361212 A1 | 12/2015 | Takahashi et al. | |
| 2017/0306144 A1 | 10/2017 | Kobayashi | |
| 2018/0072914 A1 | 3/2018 | Kim et al. | |
| 2018/0094132 A1 | 4/2018 | Kobayashi | |

FOREIGN PATENT DOCUMENTS

| | | | | |
|---|---|---|---|---|
| CN | 106923930 B | | 7/2018 | |
| JP | H09132638 A | * | 5/1997 | |
| WO | WO-2015098803 A1 | * | 7/2015 | ......... B29C 47/0004 |

OTHER PUBLICATIONS

International Search Report, PCT/US22/39432, dated Oct. 17, 2022.

* cited by examiner

*Primary Examiner* — Mark S Kaucher

(57) ABSTRACT

The patent application discloses a degradable polymers compounds. The polymer compounds comprises product of blends of polyglycolic acid and polylactic acid in a weight ratio of from about 99/1 to about 50/50 in mixture with a compatibilizer poly(lactic-co-glycolic acid), wherein the compounded product has a tensile strength of at least about 12,000 psi.

18 Claims, 4 Drawing Sheets

MODIFIED POLYGLYCOLIC ACID AND MOLDED ARTICLES FOR DEGRADABLE DOWNHOLE TOOLS APPLICATION

TECHNICAL FIELD

The invention disclosure relates to polyglycolic acid resin compound containing polylactic acid, and compatibilizer, and molded articles therefrom. More particularly, the present invention relates to a technique regarding biodegradable polymer compounds of modified polyglycolic acid and molded articles for degradable downhole tools application.

BACKGROUND

Degradable materials have many uses in our society, ranging from making degradable plastic bags, diapers, and water bottles, to making degradable excipients for pharmaceutical delivery and degradable implants for surgical use, to a wide variety of industrial uses, such as in soil remediation, agriculture, and oil and gas production.

For example, degradable materials have been used for fluid loss control, for diversion, and as temporary plugs in downhole applications of oil and gas production.

Examples of degradable materials that have been used in oil-well downhole include rock salt, benzoic acid flakes, wax beads, wax buttons, oil-soluble resin materials, and the like. In addition to filling and blocking fractures and permeable zones right in the reservoir, degradable materials have also been used to form consolidated plugs in wellbores that degrade after use, eliminating the need for retrieval.

New materials that can be used in such applications are always needed, and in particular materials that quickly degrade under downhole conditions are particularly needed.

SUMMARY

In one aspect, one embodiment discloses a degradable composite. The composite comprises a reaction product of polyglycolic acid and polylactic acid. The weight ratio of polyglycolic acid and polylactic acid may be from about 99/1 to about 50/50 in mixture with a compatibilizer. The reaction product may have a tensile strength of at least about 12,000 psi.

Optionally in any aspect, the reaction product of the degradable composite may have a tensile modulus of at least 140000 psi.

Optionally in any aspect, the reaction product of the degradable composite may exhibit a weight-average molecular weight of at least 100,000 as a whole.

Optionally in any aspect, the reaction product of the degradable composite may exhibit a weight-average molecular weight of at least 100,000 as a whole.

Optionally in any aspect, the polyglycolic acid and the polylactic acid are blended in a weight ratio of from about 99/1 to about 70/30.

Optionally in any aspect, the polyglycolic acid and the polylactic acid are blended in a weight ratio of from about 99/1 to about 95/5, and the composition is in a completely dissolved polymer-alloy state.

Optionally in any aspect, the compatibilizer comprises a copolymer.

Optionally in one aspect, the copolymer comprises poly(lactic acid-co-glycolic acid) (PLGA).

Optionally in any aspect, the formed product has an elongation at break of at least about 2%.

Further in another aspect, one embodiment discloses a process for producing a degradable composition. The process may comprise injection molding polyglycolic acid and polylactic acid in a weight ratio of from about 99/1 to about 50/50 in the presence of a compatibilizer. The degradable composition may have an elongation at break of at least about 3%.

Optionally in any aspects, the polyglycolic acid may contain the compatibilizer that is injection molded with the polylactic acid.

Optionally in any aspects, the injection molding may be performed by means of a single-screw extruder.

In yet another aspect, one embodiment discloses an article formed from a polyglycolic acid resin composition. The resin composition comprises a product injection molding from a polylactic acid, a polyglycolic acid, and a compatibilizer. The composition may have about 1 to about 30% by mass of the polylactic acid. The composition may be injection molded between about 180° C. and 220° C.

Optionally in any aspect, the article formed from the polyglycolic acid resin composition may have an elongation at the breaking point of at least about 2% in a stress-strain measurement.

BRIEF DESCRIPTION OF THE DRAWINGS

In order to illustrate the technical solutions more clearly in the embodiments of the present disclosure or the exemplary techniques, the drawings to be used in the embodiments or the description of the exemplary embodiments will be briefly described below. Obviously, the drawings in the following description are only certain embodiments of the present disclosure, and other drawings may be obtained according to the structures shown in the drawings without any creative work for those skilled in the art.

Figure 1:
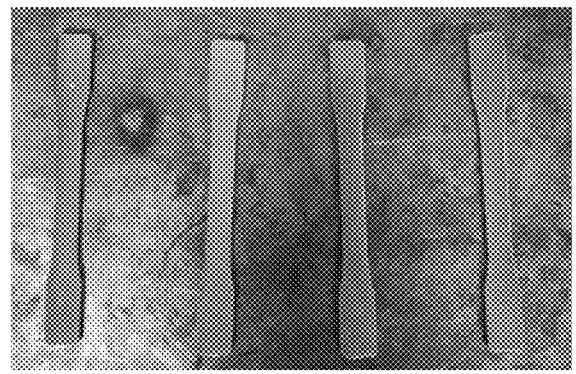
FIG. 1 shows various blends of tensile bars made from injection molding: from left to right: PGA, PGA/PLA 80/20, PGA/PLA/PLGA 80/20/1, PGA/PLA/PLGA 80/20/2.

The implementation, functional features and advantages of the present disclosure will be further described with reference to the accompanying drawings.

DETAILED EMBODIMENTS

Definitions

The term "about" means plus or minus 20%, more preferably plus or minus 10%, even more preferably plus or minus 5%, most preferably plus or minus 2%.

The invention is not limited to the particular methodology, protocols, and reagents described herein because they may vary. Further, the terminology used herein is for the purpose of describing particular embodiments only and is not intended to limit the scope of the present invention. As used herein and in the appended claims, the singular forms "a," "an," and "the" include plural reference unless the context clearly dictates otherwise.

Unless defined otherwise, all technical and scientific terms and any acronyms used herein have the same meanings as commonly understood by one of ordinary skill in the art in the field of the invention. Although any methods and materials similar or equivalent to those described herein can be used in the practice of the present invention, the preferred methods, devices, and materials are described herein.

All patents, patent applications, and publications mentioned herein are incorporated herein by reference to the extent allowed by law for the purpose of describing and disclosing the compounds and methodologies reported therein that might be used with the present invention. However, nothing herein is to be construed as an admission that the invention is not entitled to antedate such disclosure by virtue of prior invention.

All percentages for weights expressed herein are by weight of the total food product unless specifically stated otherwise.

The technical means, creative features, objectives, and effects of the patent application may be easy to understand, the following embodiments will further illustrate the patent application. However, the following embodiments are only the preferred embodiments of the utility patent application, not all of them. Based on the examples in the implementation manners, other examples obtained by those skilled in the art without creative work shall fall within the protection scope of the present invention. The experimental methods in the following examples are conventional methods unless otherwise specified. The materials and reagents used in the following examples can be obtained from commercial sources unless otherwise specified.

The Inventions

This exemplary embodiment is about a modified polyglycolic acid resin with polylactic acid and related molded articles for the degradable downhole tool application. The modification of polyglycolic acid includes blending with minor component aliphatic polyester polylactic acid, compatibilizer poly (lactic acid-co-glycolic acid). The blend material show very good mechanical properties, similar degradation as pure PGA. The compatibilizer improves the elongation at break. The PLA formed well dispersed phases within PGA matrix.

As PGA possesses chemical resistance, high mechanical strength, high temperature performance, and hydrolytic degradable in the downhole environment. But the shortcoming is that PGA is not impact resistant, and has large shrinkage for the large, molded parts targeting to the downhole tool application.

Here, the PGA were modified with blending other degradable polymers, including PLA, PLGA. These modifications are intending to reduce the molding shrinkage, also reduce the brittleness. For the blend of PGA/PLA with small amount of PLGA, the PLGA (is a copolymer P(LA-co-GA)) is acting as compatibilizer between PGA and PLA, and making the minor PLA component well dispersed and with very small domain size within the PGA matrix via increasing the interfacial bonding between PGA and PLA phases. Due to the well-dispersion and minor component of PLA, PLA has a minimum effect on the degradation of PGA, so the PLA will reduce or delay the degradation rate of PGA and also increase the impact resistance and elongation of PGA.

Polyglycolic Acid (PGA) Resin

The PGA contained in the PGA composition of the present invention refers not only to homopolymers of glycolic acid consisting of repeating units of glycolic acid represented by the formula: (—O—$CH_2$—CO—) (including ring-opened polymers of glycolides as bimolecular cyclic esters of glycolic acid), but also to polyglycolic acid copolymers (PGA copolymers) containing at least 70 mass % of the repeating units of glycolic acid described above. A PGA can be synthesized by dehydrative polycondensation of a glycolic acid serving as an α-hydroxycarboxylic acid. In order to efficiently synthesize a high-molecular weight PGA, synthesis is done by performing ring-opening polymerization on a glycolide, which is a bimolecular cyclic ester of glycolic acid.

Examples of comonomers for providing a PGA copolymer together with the aforementioned glycolic acid monomers such as glycolides include glycol compounds such as ethylene glycol, propylene glycol, butanediol, heptanediol, hexanediol, octanediol, nonanediol, decanediol, 1,4-cyclohexane dimethanol, neopentyl glycol, glycerin, pentaerythritol, bisphenol A, polyethylene glycol, polypropylene glycol, and polytetramethylene glycol; dicarboxylic acids such as oxalic acid, adipic acid, sebacic acid, azelaic acid, dodecanedioic acid, malonic acid glutaric acid, cyclohexane dicarboxylic acid, terephthalic acid, isophthalic acid, phthalic acid, naphthalene dicarboxylic acid, bis(p-carboxyphenyl)methane, anthracene dicarboxylic acid, 4,4'-diphenyl ether dicarboxylic acid, 5-sodium sulfoisophthalic acid, and 5-tetrabutyl phosphonium isophthalic acid; hydroxycarboxylic acids such as lactic acid, hydroxypropionic acid, hydroxybutyric acid, hydroxyvaleric acid, hydroxycaproic acid, and hydroxybenzoic acid; lactides; lactones such as caprolactone, valerolactone, propiolactone, undecalactone, and 1,5-oxepan-2-one; carbonates such as trimethylene carbonate; essentially equimolar mixtures of aliphatic diols such as ethylene glycol and 1,4-butanediol and aliphatic dicarboxylic acids such as succinic acid and adipic acid or alkyl esters thereof; or two or more types thereof. Polymers of these comonomers can be used as starting raw materials for providing a PGA copolymer together with glycolic acid monomers such as the glycolides described above. A preferable comonomer is lactic acid, which results in the formation of a copolymer of glycolic acid and lactic acid (PGLA).

The repeating units of glycolic acid in the PGA of the PGA composition of the present invention form essentially from a PGA homopolymer having at least 70 mass %, preferably at least 80 mass %, more preferably at least 90 mass %, even more preferably at least 95 mass %, and particularly preferably at least 98 mass % of the repeating units of glycolic acid. When the ratio of repeating units of glycolic acid is too small, the expected hydrolyzability, heat resistance, mechanical characteristics, and the like of the PGA composition of the present invention become poor. Repeating units other than the glycolic acid repeating units are used at a ratio of at most 30 mass %, preferably at most 20 mass %, more preferably at most 10 mass %, even more preferably at most 5 mass %, particularly preferably at most 2 mass %, and most preferably at most 1 mass %; and no repeating units other than glycolic acid repeating units may also be used.

In order to efficiently produce the desired high-molecular weight polymer, the PGA in the PGA composition of the present invention is preferably a PGA obtained by polymerizing from 70 to 100 mass % of a glycolide and from 30 to 0 mass % of another comonomer described above. The other comonomer may be a bimolecular cyclic monomer or a mixture of both rather than a cyclic monomer, but in order to obtain the targeted PGA composition of the present invention, a cyclic monomer is preferable. A PGA obtained by performing ring-opening polymerization on from 70 to 100 mass % of a glycolide and from 30 to 0 mass % of another cyclic monomer will be described in detail hereinafter.

Glycolide

A glycolide for forming a PGA by ring-opening polymerization is a bimolecular cyclic ester of glycolic acid. The production method of a glycolide is not particularly limited, but a glycolide can typically be obtained by the thermal depolymerization of a glycolic acid oligomer. Examples of methods that can be used as a glycolic acid oligomer depolymerization method include a melt depolymerization method, a solid phase depolymerization method, and a solution depolymerization method, and a glycolide obtained as a cyclic condensate of a chloroacetic acid salt may also be used. In addition, a glycolide containing glycolic acid with a maximum glycolide content of 20 mass % may be used.

The PGA in the PGA composition of the present invention may be formed by performing ring-opening polymerization on a glycolide alone, but a copolymer may also be formed by simultaneously performing ring-opening polymerization on another cyclic monomer as a copolymer component. When a copolymer is formed, a glycolide ratio of the copolymer is at least 70 mass %, preferably at least 80 mass %, more preferably at least 95 mass %, even more preferably at least 95 mass %, particularly preferably at least 98 mass %, and most preferably at least 99 mass % which is essentially a PGA homopolymer.

Other Cyclic Monomer Other cyclic monomers that can be used as components to be copolymerized with the glycolide include bimolecular cyclic esters of hydroxycarboxylic acid such as lactides as well as cyclic monomers such as lactones (for example, beta-propiolactone, beta-butyrolactone, pivalolactone, gamma-butyrolacton, δ-Valerolactone, Beta-methyl-δ-valerolactone, 6-caprolactone, and, trimethylene carbonate, 1,3-dioxane (dioxan). A preferable other cyclic monomer is another bimolecular cyclic ester of hydroxycarboxylic acid, examples of which include L-lactic acid, D-lactic acid, alpha-hydroxybutyric acid, alpha-hydroxyisobutyric acid, alpha-hydroxyvaleric acid, alpha-hydroxycaproic acid, alpha-hydroxyisocaproic acid, alpha-hydroxyheptanoic acid, alpha-hydroxyoctanoic acid, alpha-hydroxydecanoic acid, alpha-hydroxymyristic acid, alpha-hydroxystearic acid, and alkyl-substituted products thereof. A particularly preferable other cyclic monomer is a lactide which is a bimolecular cyclic ester of lactic acid, and this may be an L-form, a D-form, a racemic form, or a mixture thereof.

The ratio of the other cyclic monomer is at most 30 mass %, preferably at most 20 mass %, more preferably at most 10 mass %, even more preferably at most 5 mass %, particularly preferably at most 2 mass %, and most preferably at most 1 mass %. When the PGA is formed from 100 mass % of a glycolide, the ratio of the other cyclic monomer is 0 mass %, and such a PGA is also included in the scope of the present invention. By performing ring-opening copolymerization on a glycolide and another cyclic monomer, it is possible to improve the molding workability by reducing the melting point (Tm, sometimes called the "crystal melting point") of the PGA copolymer, reducing the processing temperature for producing a product such as a molded product from the PGA composition, or controlling the crystallization speed. However, when the ratio of the cyclic monomers that are used is too high, the crystallinity of the PGA copolymer that is formed is diminished, and the heat resistance, mechanical characteristics, and the like are reduced.

Ring-Opening Polymerization Reaction

The ring-opening polymerization or ring-opening copolymerization of a glycolide (collectively called "ring-opening (co)polymerization" hereafter) is preferably performed in the presence of a small amount of a catalyst. The catalyst is not particularly limited, but examples include tin compounds such as tin halides (for example, tin dichloride, tin tetrachloride, and the like), organic tin carboxylates (for example, tin octanoates such as tin 2-ethylhexanoate); titanium compounds such as alkoxytitanate; aluminum compounds such as alkoxyaluminum; zirconium compounds such as zirconium acetyl acetone; and antimony compounds such as antimony halide and antimony oxide. The amount of the catalyst that is used is preferably approximately from 1 to 1,000 ppm and more preferably approximately from 3 to 300 ppm in terms of mass ratio relative to the cyclic ester.

In the ring-opening (co)polymerization of the glycolide, a protic compound such as an alcohol (which may be a higher alcohol such as lauryl alcohol) or water may be used as a molecular weight adjusting agent in order to control physical properties such as the melt viscosity or molecular weight of the produced PGA. In addition, a glycolide typically contains a minute amount of water and hydroxycarboxylic acid compounds such as glycolic acids or straight-chain glycolic acid oligomers as impurities, and these compounds also act on the polymerization reaction. Therefore, the molecular weight of the product PGA can be adjusted by quantitating the concentration of these impurities as a molar concentration by means of the neutralization titration of carboxylic acid, for example, and adding an alcohol or water as a protic compound in accordance with the target molecular weight so as to control the molar concentration of the entire protic compound with respect to the glycolide. In addition, a polyhydric alcohol such as glycerin may be added to improve the physical properties.

The ring-opening (co)polymerization of the glycolide may be bulk polymerization or solution polymerization, but bulk polymerization is used in many cases. A polymerization apparatus for bulk polymerization may be selected appropriately from various apparatuses such as an extruder type, a vertical type having paddle wings, a vertical type having helical ribbon wings, an extruder or kneader horizontal type, an ampoule type, a plate type, or a tube type apparatus. In addition, various reaction vessels may be used for solution polymerization.

The polymerization temperature can be set appropriately in accordance with the intended purpose in a range of 120° C. to 300° C., which is essentially the polymerization initialization temperature. The polymerization temperature is preferably from 130 to 270° C., more preferably from 140 to 260° C., and particularly preferably from 150 to 250° C. When the polymerization temperature is too low, the molecular weight distribution of the produced PGA tends to become wide. When the polymerization temperature is too high, the produced PGA tends to be subjected to thermal decomposition. The polymerization time is in a range of 3 minutes to 50 hours and preferably from 5 minutes to 30 hours. When the polymerization time is too short, it is difficult for polymerization to progress sufficiently, which makes it impossible to realize the prescribed weight average molecular weight. When the polymerization time is too long, the produced PGA tends to be colored.

After the produced PGA is converted to a solid state, solid phase polymerization may be further performed as desired.

Solid phase polymerization refers to the operation of performing heat treatment while maintaining a solid state by heating at a temperature less than the melting point of the PGA. As a result of this solid phase polymerization, low-molecular-weight components such as unreacted monomers or oligomers are volatilized and removed. Solid phase polymerization is preferably performed for from 1 to 100 hours, more preferably from 2 to 50 hours, and particularly preferably from 3 to 30 hours.

(Weight Average Molecular Weight (Mw))

The weight average molecular weight (Mw) of the PGA contained in the PGA composition of the present invention is typically preferably in a range of from 70,000 to 1,000,000, more preferably in a range of from 100,000 to 800,000, even more preferably in a range of from 120,000 to 500,000, and particularly preferably in a range of from 150,000 to 400,000. The weight average molecular weight (Mw) of the PGA is determined by a gel permeation chromatography (GPC) apparatus. When the weight average molecular weight (Mw) is too low, degradation progresses quickly, which may make it difficult to achieve the purpose of the present invention, or the heat resistance or the mechanical characteristics such as strength may be insufficient. When the weight average molecular weight (Mw) is too high, it may become difficult to produce the PGA composition, or the hydrolyzability or degradability may be insufficient.

Molecular Weight Distribution (Mw/Mn)

Setting the molecular weight distribution (Mw/Mn), which is expressed as the ratio (Mw/Mn) of the weight average molecular weight (Mw) to the number average molecular weight (Mn) of the PGA contained in the PGA composition of the present invention, to in a range of 1.5 to 4.0 is preferable in that the degradation rate can be controlled by reducing the amount of polymer components in the low-molecular-weight range susceptible to degradation at an early stage or polymer components in the high-molecular-weight range with fast degradation. When the molecular weight distribution (Mw/Mn) is too broad, the degradation rate is no longer dependent on the weight average molecular weight (Mw) of the PGA, which may make it difficult to control degradation. When the molecular weight distribution (Mw/Mn) is too narrow, it may be difficult to maintain the mechanical characteristics such as the strength of the PGA composition for a prescribed period of time. The molecular weight distribution (Mw/Mn) is preferably from 1.6 to 3.7 and more preferably from 1.65 to 3.5. As in the case of the weight average molecular weight (Mw), the molecular weight distribution (Mw/Mn) is determined using a GPC analysis apparatus.

Melting Point (Tm)

The melting point (Tm) of the PGA contained in the PGA composition of the present invention is typically from 180 to 245° C. and can be adjusted based on the weight average molecular weight (Mw), the types and content ratios of copolymerization components, and the like. The melting point (Tm) of the PGA is preferably from 190 to 240° C., more preferably from 195 to 235° C., and particularly preferably from 200 to 230° C. The melting point (Tm) of a homopolymer of the PGA is typically approximately 220° C. When the melting point (Tm) is too low, the heat resistance or the mechanical characteristics such as strength may be insufficient. When the melting point (Tm) is too high, the workability of the PGA composition may be insufficient, or it may not be possible to sufficiently control the formation of the product, which may prevent characteristics such as the hydrolyzability or biodegradability from falling within the desired ranges. The melting point (Tm) of the PGA is determined in a nitrogen atmosphere using a differential scanning calorimeter (DSC).

Glass Transition Temperature (Tg)

The glass transition temperature (Tg) of the PGA contained in the PGA composition of the present invention is typically from 25 to 60° C., preferably from 30 to 55° C., more preferably from 32 to 52° C., and particularly preferably from 35 to 50° C. The glass transition temperature (Tg) of the PGA can be adjusted by the weight average molecular weight (Mw), the molecular weight distribution, the types and content ratios of the copolymer components, and the like. The glass transition temperature (Tg) of the PGA is determined in a nitrogen atmosphere using a differential scanning calorimeter (DSC).

Melt Flow Rate (MFR)

The melt flow rate (MFR) of the PGA contained in the PGA composition of the present invention is ordinarily preferably within a range of from 0.1 to 100 g/10 min, more preferably within a range of from 1 to 50 g/10 min, and even more preferably within a range of from 2 to 20 g/10 min. The MFR of the PGA is expressed as the amount of fluid flow (g) per 10 minutes measured at a temperature of 240° C. under a load of 2.16 kg. When the MFR of the PGA is too high, it may not be possible to secure molding workability depending on the production process, or the mechanical characteristics such as the strength of a product obtained from the PGA composition may be insufficient, which may prevent a PGA composition having the desired characteristics from being obtained. When the MFR of the PGA is too low, it may become difficult to mold the resulting PGA composition.

Other Resins or Additives

The PGA composition of the present invention may further contain other biodegradable resins, other resins, or other additives as long as they do not conflict with the purpose of the present invention.

Other Biodegradable Resins

Examples of other biodegradable resins that may be further contained in the PGA composition of the present invention include polyhydroxyalkanoates such as polyhydroxybutylate, polyhydroxyvalerate, polyhydroxycaproate, polyhydroxyheptanoate, and poly(hydroxybutylate/hydroxyvalerate); polyesters formed from dicarboxylic acids and diols such as polyethylene succinate, polybutylene succinate, and polybutylene succinate adipate; polyether esters such as polydioxanone; aliphatic polycarbonates such as polytrimethylene carbonate; polyamino acids such as poly-alpha-pyrrolidone, polyasparagine, and polylysine; and copolymers or mixtures thereof, but PLA is preferable. When the PGA composition of the present invention contains another biodegradable resin, it is possible to adjust the degradability—that is, the hydrolyzability or biodegradability, the workability or the mechanical characteristics such as strength. When the PGA composition of the present invention contains a PGA and another biodegradable resin, the ratio PGA is preferably at least 70 parts by mass, more preferably at least 80 parts by mass, even more preferably 90 parts by mass, and particularly preferably at least 95 parts by mass when the total of the PGA and the other biodegradable resin is defined as 100 parts by mass.

Other Resins

Examples of other resins that may be further contained in the PGA composition of the present invention include polyolefin resins such as polyethylene and polypropylene; polyamide resins such as poly-L-lysine; acrylic resins; polyethers such as polyethylene glycol and polypropylene glycol; denatured polyvinyl alcohol; soft polyolefin resins such as ethylene/glycidyl methacrylate copolymers, ethylene/propylene terpolymers, and ethylene/butylene homopolymers; styrene copolymer resins; polyphenylene sulfide resins; polyether ether ketone resins; polyester resins such as polyethylene terephthalate and polybutylene terephthalate; polyacetal resins; polysulfone resins; polyphenylene ether resins; polyimide resins; polyether imide resins; cellulose esters; polyurethane resins; phenol resins; melamine resins; unsaturated polyester resins; silicone resins; and epoxy resins. Two or more types of these other resins may also be mixed and contained in the composition. The workability or the mechanical properties such as strength of the PGA composition of the present invention can be adjusted by further containing other resins together with another biodegradable resin or without containing another biodegradable resin. When the PGA composition contains the other resins, the content of the other resins is ordinarily at most 30 parts by mass, preferably at most 20 parts by mass, and more preferably at most 10 parts by mass per 100 parts by mass of the PGA, and the content may also be 5 parts by mass or lower or 1 part by mass or lower.

PLA

Polylactic acid or polylactide (PLA) is a thermoplastic aliphatic polyester often derived from renewable resources. Polylactic acid is considered biodegradable under certain conditions and may be degraded through a hydrolysis reaction. Generally speaking, amorphous polylactic acid degrades more readily than crystalline polylactic acid, which is generally a more pure form of poly-D-lactide or poly-L-lactide.

D-lactide is a dilactone, or cyclic dimer, of D-lactic acid. Similarly, L-lactide is a cyclic dimer of L-lactic acid. Meso D,L-lactide is a cyclic dimer of D-, and L-lactic acid. Racemic D,L-lactide comprises a 50/50 mixture of D-, and L-lactide. When used alone herein, the term "D,L-lactide" is intended to include meso D,L-lactide or racemic D,L-lactide. Poly(lactic acid) may be prepared from one or more of the above. The chirality of the lactide units provides a means to adjust degradation rates as well as physical and mechanical properties. Poly(L-lactide), for instance, is a semicrystalline polymer with a relatively slow hydrolysis rate. Poly (D,L-lactide) is an amorphous polymer with a faster hydrolysis rate. The stereoisomers of lactic acid may be used individually combined or copolymerized in accordance with the present invention.

During the degradation of polylactic acid, an acid is generated which can then dissolve or react with downhole materials including, but not limited to, acid soluble bridging agents (calcium carbonate), polymers such as pH reversible gels, and shrinkable clays.

In some embodiments, the amorphous polylactic acid may be particles, rods, fibers, flakes, or a thin film.

Compatibilizer

A blend is a physical mixture of two or more components which typically offers a compromise of properties and economies of the individual components. It is well known that the nature and properties of the interface of components in a blend frequently exert a limiting effect on the bulk properties of a multi-phase blend material. In fact, the physical and mechanical properties of a blend are very often inferior to the mathematical average of the properties of the original components. Blend components can be miscible or immiscible in their behavior toward each other.

Alloys are different from blends. Although they are also composed of two or more components, alloys exhibit strong intermolecular forces wherein intermolecular bonding between the components of the blend is provided by compatibilizers. This bonding in turn, creates new properties different from those of the original components and often exceeding those of the average of the original ingredients. The types of interaction or "chemical bonding" between the components can include, for example, one or more of the following mechanisms: ionic; covalent; molecular interpenetration; hydrogen bonding; or associative.

Successful compatibilization by one or more of these interactions gives rise to interfacial adhesion to provide the formation of cohesive multi-phase compatibilized alloys with useful properties. To achieve compatibilization a number of strategies have emerged. In one approach, suitable block or graft copolymers are introduced to serve as macromolecular emulsifiers providing covalent bonds that traverse and fortify the blend interface. Block and graft copolymers may be generated in-situ through reactive extrusion and blending to generate a compatibilized blend.

In another approach, polymers having nucleophilic functional groups are interacted with compatibilizers containing hydrogen to form hydrogen bonding. Ionomers have also served as compatibilizers. In some cases, ionic or strong physicochemical interactions are generated across the interface, which in turn enhances compatibilization.

Compatibilization can also result from the addition of a similar functional group using the "like attract like" theory, such as the use of chlorinated polyethylene to compatibilizer polyvinyl chloride with polyethylene. This has been referred to as "associative" bonding. Finally, compatibilization has even been demonstrated by the addition of a third immiscible phase component that exhibits relatively low interfacial tension with each of the primary blend components, i.e., those components intended to be compatibilized. The compatibilizing effects of the mutually miscible component may result from its presumed tendency to become enriched in the vicinity of the blend interface.

Alloying provides a tool to lower the cost of high performance resins while at the same time retaining many of the desirable properties and/or providing improved properties such as increased processability. The most successful alloying procedures result in a controlled and stable morphology with a singular thermodynamic profile. However, even when alloying is not "complete" in the multi-component system useful compositions can result.

The compatibilizer Poly(lactic acid-co-glycolic acid) (PLGA) were prepared by ring-opening polymerization of both cyclic monomers lactide and glycolide. The comonomer of glycolic acid in the copolymer is ranging from 1% to 50%, and prefer from 5% to 45%, from 10% to 40%, from 15% to 35%, etc. The prepared copolymer had MFR ~50, and in the form powders or flakes, or pellets. During the melt blending of PGA and PLA with adding of the compatibilizer PLGA, the desired case is that compatibilizer PLGA was dispersed in interphase between PGA and PLA, the part of PLA of the copolymer PLGA mixed in the PLA phase, while the PGA of the copolymer PLGA mixed in the PLA phase, so the copolymer PLGA increase the interfacial bonding between PGA and PLA phase, making the minor phase size smaller and reducing the interfacial defects. So the principle is to use A-co-B copolymer (as compatibilizer) to compatibilize polymer blend A/B.

Other Additives

Examples of other additives that may be further contained in the PGA composition of the present invention are additives which are ordinarily compounded with PGA compositions such as plasticizers (polyester plasticizers, glycerin plasticizers, polyhydric carboxylic acid ester plasticizers, phosphoric acid ester plasticizers, polyalkylene glycol plasticizers, epoxy plasticizers, and the like), antioxidants, thermal stabilizers, end capping agents, UV absorbers, flame retardants (bromine flame retardants, phosphorus flame retardants, antimony compounds, melamine compounds, and the like), lubricants, waterproofing agents, water repellents, mold releasing agents, waxes, colorants such as dyes or pigments; oxygen absorbers, crystallization accelerators, nucleating agents, hydrogen ion concentration adjusting agents, and fillers other than inorganic fillers. Two or more types of these other additives may also be mixed and contained in the composition. The content of the other additives is ordinarily at most 10 parts by mass and preferably at most 5 parts by mass per 100 parts by mass of the PGA, and the content may also be 1 part by mass or lower.

End-Capping Agent

Of these additives, a carboxyl group end-capping agent or a hydroxyl group end-capping agent is blended into the PGA composition, in particular, the degradability—in particular, the hydrolyzability—of the PGA composition can be controlled, and the storability of the PGA composition can be improved. That is, by blending a carboxyl group end-capping agent or a hydroxyl group end-capping agent into the composition, the unanticipated degradation of the resulting PGA composition during storage until use in molding or another process can be suppressed, and which makes it possible to suppress decreases in molecular weight and to adjust the speed of hydrolysis or biodegradation of the PGA composition. As an end-capping agent, it is possible to use a compound known as a water resistance improving agent for a PGA having a carboxyl group end-capping action or a hydroxyl group end-capping action. A carboxyl group end-capping agent is preferable as an end-capping agent from the perspective of the balance of the hydrolyzability or biodegradability and the hydrolysis resistance during storage. Examples of carboxyl group end-capping agents include carbodiimide compounds such as N,N'-2,6-diisopropyl phenyl carbodiimide; oxazoline compounds such as 2,2'-m-phenylene bis(2-oxazoline), 2,2'-p-phenylene bis(2-oxazoline), 2-phenyl-2-oxazoline, and styrene-isopropenyl-2-oxazoline; oxazine compounds such as 2-methoxy-5,6-dihydro-4H-1,3-oxazine; epoxy compounds such as N-glycidyl phthalimide, cyclohexene oxide, and tris(2,3-epoxypropyl)isocyanurate; and the like. Of these carboxyl group end-capping agents, carbodiimide compounds are preferable. Any of aromatic, alicyclic, and aliphatic carbodiimide compounds can be used, but aromatic carbodiimide compounds are particularly preferable, and compounds with high purity, in particular, provide a water resistance improving effect during storage. In addition, diketene compounds, isocyanates, and the like can be used as hydroxyl end-capping agents. The carboxyl end-capping agent or hydroxyl end-capping agent is typically used at a ratio of 0.01 to 5 parts by mass, preferably from 0.05 to 3 parts by mass, and more preferably from 0.1 to 1 part by mass per 100 parts by mass of the PGA.

In addition, when the PGA composition contains a thermal stabilizer, the heat deterioration at the time of molding or the like can be suppressed, and the long-term storability of the PGA composition improves, which is more preferable. Examples of thermal stabilizers include phosphoric acid esters having a pentaerythritol skeleton structure such as cyclic neopentane tetraiyl bis(2,6-di-tert-butyl-4-methylphenyl)phosphite, cyclic neopentane tetrayl bis(2,4-di-tert-butylphenyl)phosphite, and cyclic neopentane tetrayl bis(octadecyl)phosphite; alkyl phosphate esters or alkyl phosphite esters having an alkyl group with preferably from 8 to 24 carbon atoms such as mono- or di-stearyl acid phosphates or mixtures thereof [a known commercially available product is a mixture of approximately 50 mass % of monostearyl phosphate and approximately 50 mass % of distearyl phosphate (trade name "AX-71" made by ADEKA Co., Ltd.)]; carbonates such as calcium carbonate and strontium carbonate (which may also be contained as inorganic fillers); hydrazine compounds typically known as polymerization catalyst deactivators having —CONHNH—CO— units such as bis[2-(2-hydroxybenzoyl)hydrazine]dodecanoic acid and N,N'-bis[3-(3,5-di-t-butyl-4-hydroxyphenyl)propionyl]hydrazine; triazole compounds such as 3-(N-salicyloyl)amino-1,2,4-triazole; and triazine compounds. These thermal stabilizers may each be used alone or in a combination of two or more types thereof. The thermal stabilizer is typically used at a ratio of at most 3 parts by mass, preferably from 0.001 to 1 part by mass, more preferably from 0.005 to 0.5 parts by mass, and particularly preferably from 0.01 to 0.1 parts by mass (100 to 1,000 ppm), per 100 parts by mass of the PGA.

Polyglycolic Acid Resin Composition

The PGA composition of the present invention is a PGA composition containing from 50 to 90 mass % of a PGA, from 50 to 10 mass % of a PLA with a compatibilizer. The reaction product may have a tensile strength of at least about 12,000 psi.

The PGA composition of the present invention may be of any shape or form such as a raw material for molding such as a pellet, strand, or powder (including melt-mixed compositions and compositions obtained by melt-kneading using an extruder as described below), a sheet, a film, an extrusion-molded product, an injection-molded product, a compression-molded product, a blow-molded product, or a laminate or other composite thereof.

[Percentage of Mass Loss of the Polyglycolic Acid Resin after Immersion in 0.3 wt % Potassium Chloride (KCL) in Water for 6 Days at 90° C.]

The percentage of mass loss of the PGA in the PGA composition of the present invention after immersion in water for 6 days at 90° C. (sometimes called the "percentage of mass loss after 6 days at 90° C.") is at least 50%, preferably at least 53%, more preferably at least 55%, and even more preferably at least 30%. Since the percentage of mass loss of the PGA of the present invention after 6 days at 90° C. is at least 50% and more preferably at least 55%, the composition may have excellent moldability and mechanical characteristics as well as excellent heat resistance and hydrolyzability.

The percentage of mass loss of the PGA composition after 6 days at 90° C. is measured by the following method. Specifically, an evaluation test specimen with a dumbbell shape (the dumbbell shape specifications are in accordance with ISO 294) is created by injection molding, and the mass of the evaluation test specimen is measured. The mass of the PGA in the evaluation test specimen (called the "pre-test PGA mass" hereafter) is calculated with reference to the content ratio of the inorganic filler. After the retrieved evaluation test specimen is subjected to cold air blowing and vacuum drying to remove the water content, the mass of the evaluation test specimen is measured, and the mass of the PGA in the evaluation test specimen after the test (called the "post-test PGA mass" hereafter) is measured. The percentage of mass loss of the PGA composition after 6 days at 90° C. is calculated from the following calculation formula.

Calculation formula:
$$\text{Percentage of mass loss after 6 days at 90° C. (\%)} = (\text{pre-test PGA mass} - \text{post-test PGA mass})/\text{pre-test PGA mass} \times 100$$

[Melt Flow Rate (MFR)]

The melt flow rate (MFR) of the PGA contained in the PGA composition of the present invention is ordinarily preferably within a range of from 0.1 to 100 g/10 min, more preferably within a range of from 1 to 80 g/10 min, and even more preferably within a range of from 2 to 20 g/10 min. The MFR of the PGA composition is expressed as the amount of fluid flow (g) per 10 minutes measured at a temperature of 240° C. under a load of 2.16 kg. When the MFR of the PGA composition is too high, it may not be possible to secure molding workability depending on the production process, or the mechanical characteristics such as the strength of a product obtained from the PGA composition may be insufficient. When the MFR of the PGA composition is too low, it may become difficult to mold the PGA composition, which may prevent a product obtained from a PGA composition having the desired characteristics from being obtained.

[Mechanical Characteristics]

The PGA composition of the present invention has an excellent balance of mechanical characteristics. Specifically, the following conditions required as mechanical properties can be met:
 (a) the Charpy impact strength (according to ISO 179) is at least 3 KJ/m2, preferably at least 4 KJ/m2, and more preferably at least 5 KJ/m2;
 (b) the tensile strength (according to ISO 527) is at least 50 MPa and preferably at least 70 MPa;
 (c) the elasticity (according to ISO 527) is at least 1% and preferably at least 1.5%;

Method for Producing Polyglycolic Acid Resin Composition

The method for producing the PGA composition of the present invention is not particularly limited as long as it is possible to obtain a PGA composition containing polyglycolic acid and polylactic acid in a weight ratio of from about 99/1 to about 50/50 in mixture with a compatibilizer, wherein the reaction product has a tensile strength of at least about 12,000 psi.

A step of injection molding using an extruder refers to a step of supplying a raw material containing polyglycolic acid and polylactic acid in a weight ratio of from about 99/1 to about 50/50 in mixture with a compatibilizer to an extruder provided with a screw and a cylinder, heating and melting the raw material while heating the raw material based on external heating and shear heating, extruding the material into a shape such a rod shape, and if desired, cutting the material into pellets of with a length of approximately a prescribed number of mm so as to form a PGA composition having a prescribed material composition.

In particular, a PGA composition obtained by a method for producing a PGA composition including a step of injection molding using a single screw extruder has good dispersion/distribution efficiency and can be formed into a product of a PGA composition having various forms/shapes such as a sheet, a film, or an injection-molded product, and a product made of the PGA composition having excellent moldability, mechanical characteristics, heat resistance, hydrolyzability, and biodegradability can thus be obtained, which is preferable.

An extruder provided with a main feed port and a side feed port is an extruder which is provided with both a main feed port for supplying most of the material for forming the PGA composition such as a PGA, a PLA, and compatibilizer (ordinarily in the form of a solid) to the extruder at a position on the screw driver part side of the extruder, and a side feed port for supplying part of the material for forming the PGA composition to the extruder at a position in the middle of the main feed port and an extrusion port (nozzle) on the tip side of the screw of the extruder. With respect to the cylinder length (L) of the extruder, the side feed port can ordinarily be provided from 0.2 to 0.9 L, preferably from 0.4 to 0.8 L, and more preferably from 0.5 to 0.75 L from the screw driver part side.

The supply of the PGA to the extruder from the main feed port and/or the side feed port can itself be achieved by a known method and mechanism. For example, a method in which the materials are supplied to the extruder via a hopper installed on the main feed port and/or the side feed port may be used, or a method in which the materials are supplied to the extruder via a feeder or an extruder installed on the main feed port and/or the side feed port may be used.

As described above, the extruder provided with a screw and a cylinder and having functions of heating, melting the raw material based on external heating and shear heating. Most of the material for forming the PGA composition that is supplied from the main feed port—the PGA, the PLA, and compatibilizer, in particular—is in a solid form, and after the material is heated and melted based on external heating and shear heating, it is sent to the extrusion port (nozzle) in a molten fluid state. Accordingly, in the method for producing a PGA composition according to the present invention, the thermal history such as the shear heat generation in the PGA composition can be adjusted from the main feed port and the side feed port.

Examples

The PGA composition of the present invention will be described in further detail hereinafter using working examples and comparative examples. The present invention is not limited to these working examples. The characteristics of the PGA and the PGA composition were measured with the following methods.

The Compounded Sample Preparation and Test

Injection molding was conducted on a Toyo Plastar machine. For PGA/PLA blends, the materials were pre-mixed with pellets, then dried to moisture level below 0.025%, and then directly injection molded to create the ASTM D638 standard tensile bars and flexural specimens for further mechanical and degradation test. Detailed injection molding conditions are list in Table 1.

TABLE 1 injection molding conditions

|  | PGA | PGA/PLA blends | PLA |
|---|---|---|---|
| barrel temp (F.) | 473 | 473 | 400 |
| mold temp (C.) | 90 | 90 | 100 |
| injection speed | 72% | 72% | 72% |
| pack pressure (Psi) | 450-500 | 450-500 | 350 |
| pack time (sec) | 13 | 13 | 8 |
| screw recovery | 25+% | 8% | 25+% |
| Back Pressure (Psi) | 40 | 40 | 40 |

Besides injection molding, the polymer compounds can be molded with compression molding, as well as extrusion molding.

(Weight Average Molecular Weight (Mw) and Molecular Weight Distribution (Mw/Mn))

The weight average molecular weight (Mw) of the PGA was obtained using a GPC analysis apparatus. Specifically, after 10 mg of a PGA sample was dissolved in hexafluoroisopropanol (HFIP) in which sodium trifluoroacetate was dissolved at a concentration of 5 mM to form 10 mL, the solution was filtered with a membrane filter to obtain a sample solution. 10 μL of this sample solution was injected into the GPC analysis apparatus, and the weight average molecular weight (Mw) and the molecular weight distribution (Mw/Mn) were determined from the results found by measuring the molecular weight under the following measurement conditions.

<GPC Measurement Conditions>

Apparatus: GPC104 manufactured by Showa Denko K.K.

Columns: two HFIP-806M columns (connected in series)+one HFIP-LG precolumn manufactured by Showa Denko K.K.

Column temperature: 40° C.

Eluent: HFIP solution in which sodium trifluoroacetate was dissolved at a concentration of 5 mM Detector: differential refractometer Molecular weight calibration: Calibration curve data for the molecular weight was created using five types of methyl polymethacrylate (manufactured by Polymer Laboratories Ltd.) with different standard molecular weights.

(Melting Point (Tm) and Glass Transition Temperature (Tg))

The melting point (Tm) and the glass transition temperature (Tg) of the PGA were determined in a nitrogen atmosphere using a differential scanning calorimeter (DSC; Q20, TA Instruments.).

[Melt Flow Rate (MFR)]

The melt flow rate (MFR) of the PGA and the PGA composition was measured as the amount of fluid flow (g) per 10 minutes measured at a temperature of 240° C. under a load of 2.16 kg.

[Tensile Strength and Elasticity]

The tensile strength and elasticity of the PGA composition were measured in accordance with ISO 527.

Tensile tests were conducted on the injection molded tensile bars using the MTS QTest/50LP equipped with a 2 in extensometer. Five random samples were taken and measured following the ISO 527 method. The sample width and thickness in the waisted area and the testing speed 10 mm/min.

The degradation testing were conducted with same 0.3 wt % KCl aqueous solution in glass jars at the designed temperature (e.g. 90° C.).

Result and Discussions:

Tensile properties test results on the modified PGA formulations from the same batch injection molding were list in Table 2. The tensile strength of PGA/PLA 95/5, 90/10, and PGA/PLA/PLGA 90/10/1 is about 2%-7% higher than the pure PGA. The copolymer PLGA used has a compolymer composition of 75% LA and 25% GA.

From Table 2, after blending with PLA to binary blend, the elongation at break of PGA/PLA blend (95/5, 90/10, 80/20, 70/30) decrease from 7% of PGA to 1.6% of PGA/PLA 70/30. This is caused by the poor interfacial bonding between PGA and PLA phases. Therefore, we introduce the PLGA compatibilizer to improve the elongation at break via improve the interfacial bonding.

With the adding compatibilizer copolymer Poly(LA-co-GA) (PLGA), the elongation at break for PGA/PLA/PLGA increase comparing with the PGA/PLA blend without compatibilizer PLGA. For 80/20 blends, the elongation break increase from 1.8% of PGA/PLA 80/20 to >10.4% of PGA/PLA/PLGA 80/20/1 and >16.4% of PGA/PLA/PLGA 80/20/2 (with adding the compatibilizer PLGA). For 70/30 blends, the elongation break increase from 1.6% of PGA/PLA 70/30 to >12.1% of PGA/PLA/PLGA 70/30/3 (with adding the compatibilizer PLGA). For 90/10 blends, the elongation break increase from 26% of PGA/PLA 90/10 to 3% of PGA/PLA/PLGA 90/10/1 (with adding the compatibilizer PLGA).

80/20/1 and 80/20/2 obviously increase (10.4% or larger) comparing the one without compatibilizer PGA/PLA 80/20 (1.8%). This indicates the compatibilizer increase the interphase bonding between the PGA and PLA phases (domains), and as a result increase the toughness of the blends. The same effect for PGA/PLA/PLGA 70/30/3 (with compatibilizer PLGA) comparing with PGA/PLA 70/30 without compatibilizer PLGA (the elongation at break >12.1% for PGA/PLA/PLGA 70/30/3 is higher than 1.6% of PGA/PLA 70/30 without compatibilizer.

Besides the obvious increase in elongation at break for PGA/PLA/PLGA with adding compatibilizer PLGA. Their tensile strength the tensile strength also slight increase with adding compatibilizer PLGA. For 90/10 blend, tensile strength increases from 16006 psi of PGA/PLA 90/10 to 16159 psi for PGA/PLA/PLGA 90/10/1 (with adding compatibilizer PLGA). For 80/20 blend, tensile strength increases from 14367 psi of PGA/PLA 80/20 to 14415 psi for PGA/PLA/PLGA 80/20/1 (with adding compatibilizer PLGA). For 70/30 blend, tensile strength increases from 12726 psi of PGA/PLA 70/30 to 13129 psi for PGA/PLA/PLGA 70/30/3 (with adding compatibilizer PLGA).

So based on the test result of elongation at break and tensile strength, adding compatibilizer PLGA improve the PGA/PLA toughness and properties.

TABLE 2

Tensile properties of the formulations

| Formulations | Tensile strength (psi) | Tensile strength (MPa) | Elongation at break (%) | Modulus (MPa) |
|---|---|---|---|---|
| PGA | 15615 | 107.7 | 7.0 | 7611.8 |
| PGA/PLA 95/5 | 16765 | 115.6 | 5.0 | na |
| PGA/PLA 90/10 | 16006 | 110.4 | 2.0 | 7645.0 |
| PGA/PLA/PLGA 90/10/1 | 16159 | 111.4 | 3.3 | 7128.4 |
| PGA/PLA 80/20 | 14367 | 99.1 | 1.8 | 7483.0 |
| PGA/PLA/PLGA 80/20/1 | 14415 | 99.4 | >10.4 | 6105.3 |
| PGA/PLA/PLGA 80/20/2 | 12892 | 88.9 | >16.5 | 5749.7 |
| PGA/PLA 70/30 | 12726 | 87.7 | 1.6 | 6687.0 |
| PGA/PLA/PLGA 70/30/3 | 13129 | 90.4 | >12.1 | 6078.0 |
| PLA | 10060 | 69.4 | 4.9 | 3861.8 |

The Degradation

Figure 2:
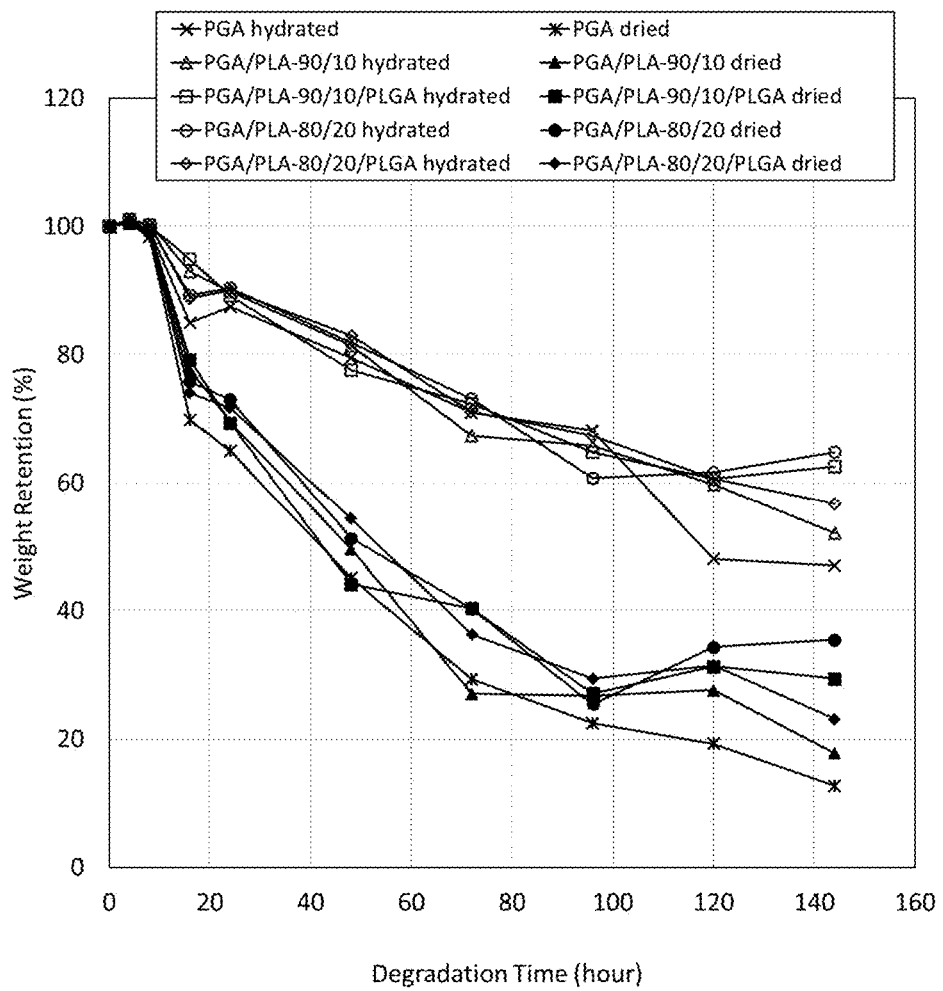
FIG. 2 shows the degradation of PGA, and PGA/PLA blends without and with compatibilizer PLGA in 0.3 wt % KCl aqueous solution at 90° C.

The degradation testing of plagues of different formulations were conducted with 0.3 wt % KCl aqueous solution in glass jars at the designed temperature (e.g. 90° C.) (FIG. 2). The results in FIG. 2 indicate all formulations (PGA, PGA/PLA blends without and with compatibilizer PLGA) show a very similar weight loss (around 50% dry weight loss). This means that forming blend didn't reduce the degradation of the formations, as the hypothesis is that the PLA (with slow degradation comparing with fast degraded PGA at 90° C.) forms well dispersed small phase within the PGA matrix. The well dispersed small phase (or domains) will not delay the degradation of the blend.

The Morphology

Figure 3A:
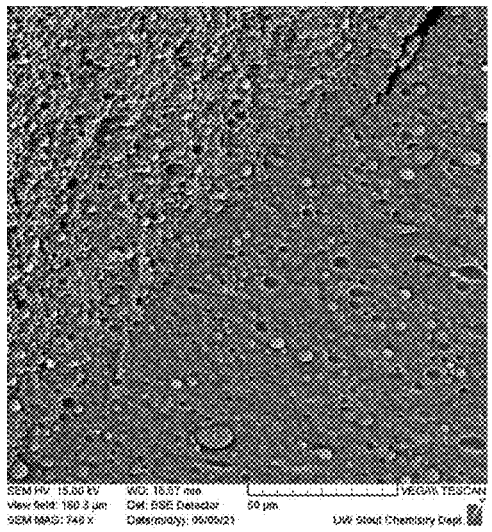
FIG. 3a shows a SEM image of the surface of PGA/PLA (90/10) after degradation for 7 days at 0.3% KCl and 70° C.
Figure 3B:
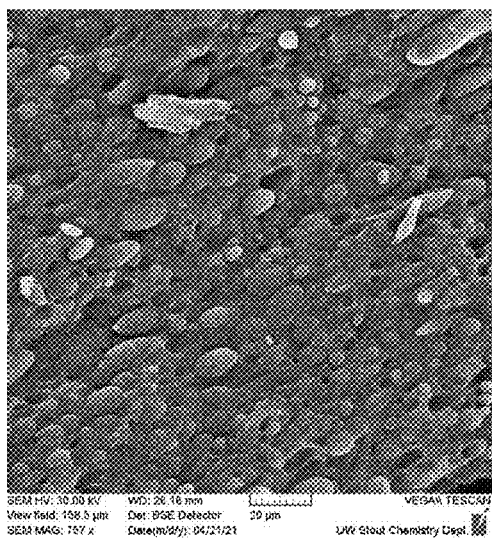
FIG. 3b shows a SEM image of the surface of PGA/PLA (70/30) samples after degradation for 7 days at 0.3% KCl and 70° C.
Figure 3C:
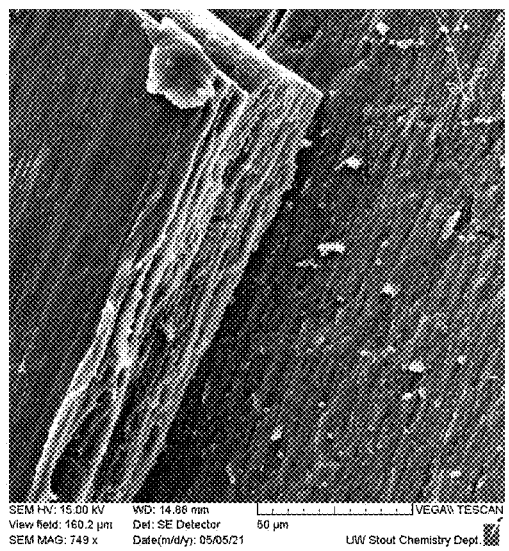
FIG. 3c shows a SEM image of the surface of PGA/PLA/PLGA (90/10/1) after degradation for 7 days at 0.3% KCl and 70° C.

The SEM images in FIG. 3 show the surface morphology of PGA/PLA 10% (FIG. 3a) and PGA/PLA 30% (FIG. 3b) samples after degradation for 7 days at 0.3% KCl and 70° C. It clearly shows that the well dispersed PLA sphere phase (a few micron (~5 micron or smaller) for PGA/PLA 90/10)) within the PGA matrix. After 7 days degradation at 70° C., the PGA were degraded fast and were removed from the surface, the PLA still maintain the sphere (or domain) dispersed phase within the PGA matrix as PLA degraded very slow at 70° C. comparing with PGA. This is like etching process to remove easy etched first component (here is PGA) and show the phase structure of second component (here is the dispersed PLA).

Also, the PLA dispersed sphere size is around or smaller than 5 microns for PGA/PLA 90/10, where about 20 microns dispersed phase (domains) are for PGA/PLA 70/30. This indicates that with increase the percentage of PLA from 10% to 30%, the size of PLA dispersed phase (domain or droplets) greatly increases from 5 micron to 20 micron.

From FIG. 3a and FIG. 3b, there are clear boundary between the two phases of PGA and PLA blend, where are the disperse phase (domain) of PLA and matrix (continual) phase of PGA. This indicates very limited interfacial bonding between two phases. But with adding the compatibilizer PLGA, PGA/PLA/PLGA 90/10/1 (FIG. 3c) didn't show clear boundary comparing with PGA/PLA 90/10 without compatibilizer (FIG. 3a). So the compatibilizer does enhance the interfacial bonding between PGA and PLA phases, thus toughening the blends with obviously improved elongation at break and slight improved tensile strength.

In conclusion, from the tensile properties, degradation and morphology study, the new developed formulations are suitable for molded (e.g. injection molding) degradable component for downhole tool application.

The above shows and describes the basic principles, main features and advantages of the utility patent application. Those skilled in the industry should understand that the present utility patent application is not limited by the above-mentioned embodiments. The above-mentioned embodiments and the description are only preferred examples of the present utility patent application and are not intended to limit the present utility patent application, without departing from the present utility patent application. Under the premise of spirit and scope, the present utility patent application will have various changes and improvements, and these changes and improvements fall within the scope of the claimed utility patent application. The scope of protection claimed by the utility patent application is defined by the appended claims and their equivalents.

We claim:

1. A degradable composite, comprising:
   a product of polyglycolic acid and polylactic acid in a weight ratio of from about 99/1 to about 50/50 in mixture with a compatibilizer, wherein formed polymer compound has a tensile strength of at least about 12,000 psi.

2. The degradable composition according to claim 1, wherein the composition exhibits a weight-average molecular weight of at least 100,000 as a whole.

3. The degradable composition according to claim 1, wherein the composition exhibits a weight-average molecular weight of at least 200,000 as a whole.

4. The degradable composition according to claim 1, wherein the polyglycolic acid and the polylactic acid are blended in a weight ratio of from about 99/1 to about 70/30.

5. The degradable composition according to claim 1, wherein the polyglycolic acid and the polylactic acid are blended in a weight ratio of from about 99/1 to about 90/10, and the composition is in a completely dissolved polymer-alloy state.

6. The degradable composition according to claim 1, wherein the compatibilizer comprises a copolymer.

7. The degradable composition according to claim 1, wherein the compatibilizer copolymer comprises poly(lactic acid-co-glycolic acid) (PLGA).

8. The degradable composition according to claim 1, wherein the compatibilizer copolymer poly(lactic acid-co-glycolic acid) (PLGA) is ranging from 0 part to 6 part (considering PGA+PLA as 100 part).

9. The degradable composition according to claim 1, wherein the formed product has an elongation at break of at least about 2%.

10. A process for producing a degradable composition, comprising: injection molding polyglycolic acid and polylactic acid in a weight ratio of from about 99/1 to about 50/50 in the presence of a compatibilizer, wherein the degradable composition has an elongation at break of at least about 2% and wherein the degradable composite has a tensile strength of at least about 12000 psi.

11. The process according to claim 10, wherein blend of polyglycolic acid and polylactic acid containing the compatibilizer is injection molded.

12. The molding process according to claim 10, wherein the injection molding is performed by means of a single-screw extruder.

13. The molding process according to claim 10, wherein the compatibilizer comprises a copolymer.

14. The process according to claim 13, wherein the copolymer comprises poly(lactic acid-co-glycolic acid) (PLGA).

15. An article formed from a polyglycolic acid resin composition comprising a product injection molding from a polyglycolic acid, a polylactic acid and a compatibilizer, wherein the composition has about 1 to about 30% by mass of the polylactic acid; wherein the composition is injection molded between about 230° C. and 260° C. and wherein the polyglycolic acid resin composition has a tensile strength of at least about 12000 psi.

16. The article formed from the polyglycolic acid resin composition according to claim 15, which has an elongation at the break of at least about 2% in a stress-strain measurement.

17. The article formed from the polyglycolic acid resin composition according to claim 15, wherein the compatibilizer comprises a copolymer poly(lactic acid-co-glycolic acid) (PLGA).

18. The article formed from the polyglycolic acid resin composition according to claim 17, wherein the compatibilizer copolymer poly(lactic acid-co-glycolic acid) (PLGA) is ranging from 0 part to 6 part (considering PGA+PLA as 100 part, where PLA from 1 to 50 part).

* * * * *